April 14, 1964  R. F. PITMAN ETAL  3,128,883
SWINGABLE BOOM TURRET STRUCTURE FOR MOBILE VEHICLES
Filed Nov. 6, 1961  2 Sheets-Sheet 1

INVENTORS.
Raymond F. Pitman
Dean E. Broderson
BY Herbert W. Gronemeyer Jr.

Hovey, Schmidt, Johnson & Hovey
ATTORNEYS.

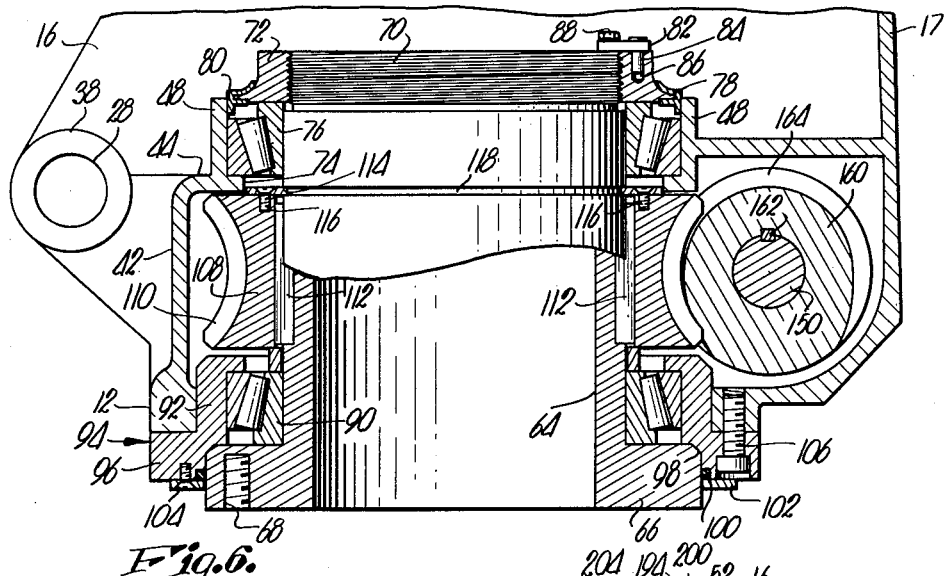

United States Patent Office 3,128,883
Patented Apr. 14, 1964

3,128,883
SWINGABLE BOOM TURRET STRUCTURE FOR MOBILE VEHICLES
Raymond F. Pitman, Prairie Village, Kans., and Dean E. Broderson and Herbert W. Gronemeyer, Jr., Kansas City, Mo., assignors to Pitman Manufacturing Company, Grandview, Mo., a corporation of Missouri
Filed Nov. 6, 1961, Ser. No. 150,530
4 Claims. (Cl. 212—68)

This invention relates to boom turret structure and has for its most important object, the provision of a turret device for use in rotatably mounting an elongated boom on a mobile vehicle, and including a power source which is carried by the rotating portion of the device and operably coupled to the support structure, whereby the device is caused to rotate relative to the support structure upon actuation of the power source to thereby preclude the necessity of chains, linkages, sprockets or the like normally carried by the support structure and operably coupled to the turret device.

Another object of the present invention is the provision of a boom turret structure of the aforesaid character which is comprised of a body formed from a casting having integral sections, whereby the turret device may be readily produced with improved structural characteristics without having to form the same by interconnecting a number of sections as has been done heretofore.

A further object of the present invention is the provision of boom turret structure having gear means thereon operably coupled with the power source and including a stationary worm gear adapted to be operably coupled to the support structure and a worm intermeshed with the ring gear and carried by the rotating portion of the boom turret device whereby the worm is caused to rotate about the worm gear responsive to the actuation of the power source to thereby rotate the latter and the rotatable portion of the boom turret device relative to the support structure.

A further object of the present invention is the provision of boom turret structure formed by a casting process to form a number of integral sections, one of which sections being a housing for enclosing the aforesaid gear means adjacent the interconnection thereof with the support structure, whereby the gear means is effectively sealed against the introduction of contaminating substances such as dirt, grime or the like which interfere with the normal operation thereof.

Other objects of the present invention will become apparent as the following specification progresses, reference being had to the accompanying drawings, wherein:

FIG. 4 is a top plan view of the boom turret structure and illustrating the interconnection thereof with the tubular supporting structure which is normally carried by a mobile vehicle or the like;

FIG. 6 is an enlarged, cross-sectional view taken along line 6—6 of FIG. 3; and

FIG. 7 is an enlarged, cross-sectional view taken along line 7—7 of FIG. 1.

Figure 1:
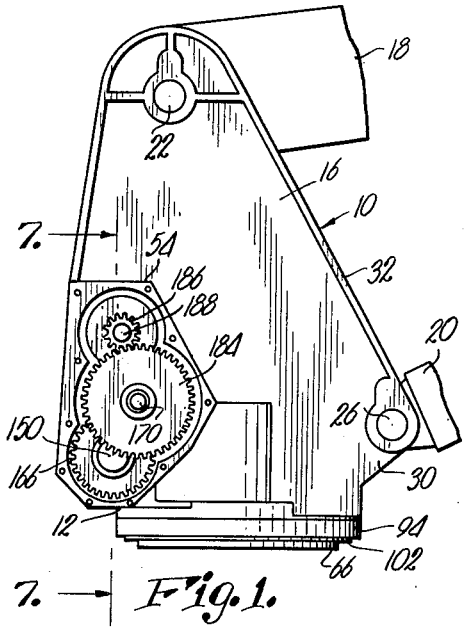
FIGURE 1 is a side elevational view of the boom turret structure which forms the subject of the present invention, and illustrating the interconnection therewith of an elongated boom and power-actuating apparatus for raising and lowering the boom.

The present invention provides boom turret structure for use in rotatably mounting an elongated boom on a mobile vehicle, and includes a body formed from a casting process. The body is provided with a base portion presenting a housing, and a pair of spaced, upright plates secured to the base portion and adapted to receive therebetween one end of an elongated boom. The boom is pivotally mounted on the plates for movement about a horizontal axis, and the base portion is rotatably mounted on stationary support structure for rotation about a vertical axis. Thus, the boom is mounted for rotation about mutually perpendicular axes, namely, the horizontal and vertical axes.

A power source is carried by the base portion between the plates for rotation therewith, the power source being in the nature of a hydraulic motor. Gear means is also carried by the base portion and includes a stationary worm gear which is adapted to be operably coupled to the support structure, and a worm secured to the base portion in meshing relationship with the worm gear. The worm is coupled with the power source and upon actuation of the latter, the worm gear "walks" around the ring gear to thereby rotate the base portion and thereby, the plates relative to the support structure about a vertical axis. Means for interconnecting the worm gear with the power source includes a plurality of planetary and sun gears which are housed within the base portion and substantially enclosed to be sealed thereby against the introduction thereinto of contaminating substances such as dirt, grime or the like.

The boom turret structure which forms the subject of the present invention is broadly denoted by the numeral 10, and includes a base portion 12 and a pair of upright plate members 14 and 16 integral with base portion 12 and extending outwardly therefrom. A back 17 spans the distance between plate members 14 and 16 and is integral therewith. Back 17 provides structural rigidity for plate members 14 and 16 and is also integral with base portion 12. Back 17 extends above the base portion 12 and terminates at an uppermost edge 19 below the uppermost edges of plate members 14 and 16.

Boom turret structure is adapted to be utilized in rotatably mounting one end 18 of an elongated boom on supporting structure, such as a mobile vehicle or the like. Structure 10 is also adapted for mounting one end 20 of power-actuating apparatus operably coupled to the boom for rotating the latter about a horizontal axis formed by a pivot pin 22 disposed within aligned openings 24 in the normally uppermost extremities of plate members 14 and 16. End 20 of the power apparatus is also pivotally mounted on structure 10 by virtue of being coupled with a pivot pin 26 receivable within aligned openings 28 in projections 30 forming portions of plate members 14 and 16 adjacent the lowermost extremities thereof.

Each of plate members 14 and 16 is provided with a flanged marginal edge 32 and webs 34 interconnecting the flanged marginal edges 32 with an annular ring 36 surrounding opening 24, thus in effect, strengthening the region of interconnection thereof with the end 18 of the boom. Similarly, each of plate members 14 and 16 is provided with a ring 38 surrounding the corresponding opening 28 to strengthen the region of interconnection thereof with the end 20 of the power apparatus coupled with the boom.

Base portion 12 includes a continuous side wall 42 of irregular configuration, and a top wall 44 integral with side wall 42. Plate members 14 and 16 are integral with and merge into side wall 42 and top wall 44, it being clear that plate members 14 and 16 and base portion 12, are formed integrally by a casting process.

Figure 4:
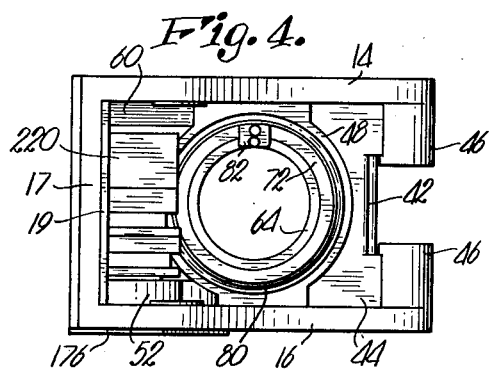
Figure 5:
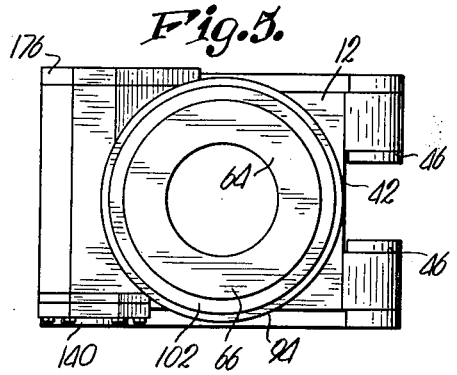
FIG. 5 is a bottom plan view of the boom turret structure shown in FIGS. 1 to 4 inclusive.

Base portion 12 further includes a pair of spaced sleeves 46 having openings which are in substantial alignment with the openings 28 in projections 30. Sleeves 46 are mounted on and are integral with the projections 30 and extend toward the opposite plate members as is illustrated in FIGS. 4 and 5. Sleeves 46 are also integral with the proximal portion of side wall 42 and project laterally therefrom.

Figure 3:
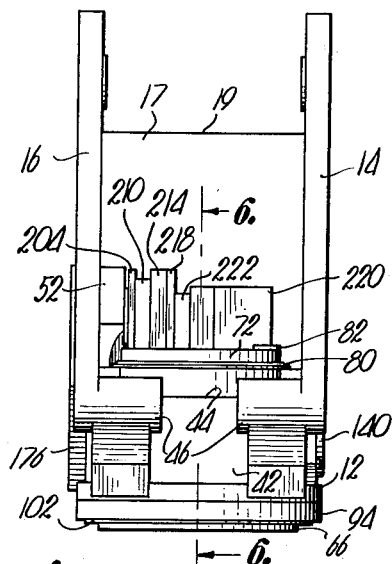
FIG. 3 is an end elevational view of the boom turret structure shown in FIGS. 1 and 2 and illustrating the position thereon of the power source associated therewith.

An annular neck member 48 is mounted on and integral with top wall 44 and extends normally upwardly from the latter. Neck member 48 is centrally located between plate members 14 and 16 as viewed in FIGS. 3 and 4 of the drawings.

An upright wall section 50 is also integral with top wall 44 and extends upwardly from the latter adjacent plate member 16, there being a coupling element 52 integrally interconnecting wall section 50 with plate member 16. Plate member 16 has a portion thereof removed adjacent the lowermost extremity thereof to form the edge 54 to which is connected the coupling element 52 to connect wall section 50 with plate member 16. Thus, wall section 50 and coupling element 52 form a region 56 which is out of the plane of plate member 16 and disposed interiorly of the latter for mounting gear means broadly denoted by the numeral 58 in a manner to be described.

Figure 2:
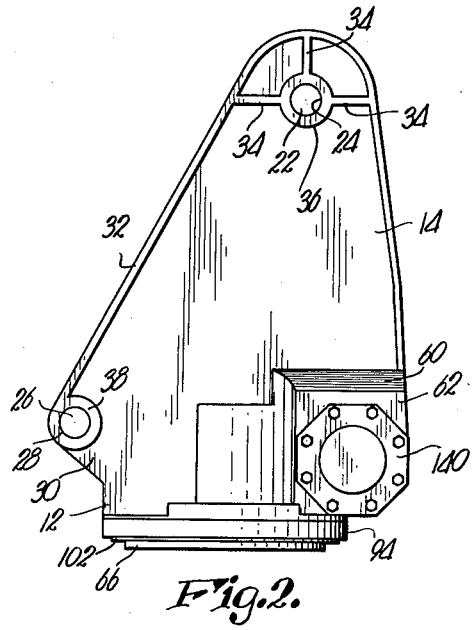
FIG. 2 is an elevational view of the turret structure shown in FIG. 1 and illustrating the opposite side thereof to show the details of construction thereof.

Plate member 14 is integral with top wall 44 by means of a coupling stretch 60 as shown in FIGS. 2 and 7, to form a depression 62 in base portion 12 adjacent the lowermost extremity of plate member 14. Region 56 and depression 62 are thereby located on opposed sides of turret structure 10 as is clear in FIG. 7.

Tubular support structure in the form of a cylinder 64, is provided with an integral flange 66 at one end thereof having threaded bores 68 for receiving connecting means to connect the flange 66 and thereby cylinder 64 to support structure, such as a mobile vehicle or the like.

Cylinder 64 extends normally upwardly from the support structure to which flange 66 is connected and is provided with an externally threaded end 70 for receiving an internally threaded bearing nut 72 for a purpose to be described. Cylinder 64 is adapted to be disposed within the confines of side wall 42 of base portion 12 and extends through an opening 74 in the top wall 44, as is clear in FIG. 6. The threaded end 70 of cylinder 64 extends above the uppermost extremity of neck member 48 and a roller bearing unit 76 is disposed between neck member 48 and the proximal portion of cylinder 64, the inner race of bearing unit 76 being in engagement with cylinder 64 and the outer race of bearing unit 76 being in engagement with the neck member 48. Bearing nut 72 is threadably mounted on the end 70 and has an annular flange 78 thereon extending laterally therefrom in overlying relationship to bearing unit 76.

A sealing gasket 80 is secured in any suitable manner to the underside of flange 78 and engages the proximal inner surface of neck member 48 to effectively enclose bearing unit 76 and seal the same from the atmosphere surrounding neck member 48. It is to be noted that the lowermost surface of bearing nut 72 engages the inner race of bearing unit 76 to maintain the latter in a fixed position between cylinder 64 and neck member 48. A locking plate 82 is connected to bearing nut 72 by virtue of a pin 84 being received within a bore 86 extending into bearing nut 72 and a stud bolt 88 being threadably received within an aligned, internally threaded bore (not shown) extending into the uppermost end of cylinder 64.

A roller-bearing unit 90 surrounds cylinder 64 adjacent the lowermost end thereof with the inner race of unit 90 being in engagement with the uppermost surface of flange 66 and the proximal outermost surface of cylinder 64. The outer race of bearing unit 90 engages the annular, upright portion 92 of an L-shaped retainer, broadly denoted by the numeral 94, in surrounding relationship with cylinder 64 and bearing unit 90. A laterally extending portion 96 integral with upright portion 92, underlies the proximal lowermost end edge of side wall 42 in supporting relationship to the latter. Portion 96 is provided with an annular recess 98 therein at the innermost face thereof for slidably receiving the normally outermost portion of flange 66, as is clear in FIG. 6. An annular O-ring 100 is seated in an appropriate groove in engagement with portion 96 and flange 66 to effectively seal off the interconnection therebetween. An annular ring 102 is secured to the underside of portion 96 by screw means 104 and retains O-ring 100 in the position illustrated in FIG. 6.

Retainer 94 is interconnected to side wall 42 by virtue of a plurality of screws 106 passing through aligned openings in portion 96 of retainer 94, and in the lowermost edge of side wall 42. By virtue of the aforesaid construction, retainer 94 and thereby, side wall 42, is rotatable about cylinder 64 and the region defined by flange 66 and bearing nut 72 surrounded by side wall 42 and neck member 48, is effectively sealed by virtue of gasket 80 and O-ring 100.

An annular ring gear 108 having concave gear teeth 110, is disposed in surrounding relationship to cylinder 64 and secured thereto by virtue of a pair of keys 112 disposed in aligned keyways in the inner surface of gear 108 and the outer surface of cylinder 64. An annular ring 114 is connected to the upper surface of gear 108 by virtue of a plurality of screws 116, and the inner peripheral edge of ring 114 is receivable within an annular groove 118 in the outermost surface of cylinder 64. Ring 114 maintains keys 112 in fixed positions, it being noted that ring 114 is disposed below and spaced from the outer surface of bearing unit 76 within opening 74 in top wall 44. Worm gear 108 is thereby rigid to cylinder 64 and is stationary as to side wall 42 when the latter rotates about cylinder 64.

Side wall 42 is provided with a pair of spaced partitions 120 and 122 having openings 124 and 126 therein respectively. A collar 128 is receivable within the opening 124 and is provided with an annular flange 130 thereon which engages the outer surface of partition 120 remote from partition 122.

Collar 128 is provided with an annular projection 132 extending toward the axis of rotation thereof, and provides a shoulder 134 for engaging the outer race of a roller-bearing unit 136 to limit the travel of the latter toward partition 122. A roller-bearing unit 138 is positioned adjacent unit 136 and is provided with an outer race in complemental engagement with the inner surface of collar 128 as shown in FIG. 7, it being clear that the outer race of unit 136 also complementally engages the inner surface of collar 128.

A cover element 140 is mounted on flange 130 by stud bolts 142 in covering relationship to the opening formed at the end of collar 128 opposite to the end having projection 132. Cover element 140 is provided with an annular extension 144 which extends into the interior of collar 128 adjacent flange 130 thereof and engages the outer race of unit 138 to limit the outward travel of the latter. It is evident that when cover element 140 is in the position shown in FIG. 7, that units 136 and 138 are maintained in fixed positions relative to partition 120 and collar 128. It is to be noted that partition 120 is adjacent depression 62 and opening 124 opens up into the latter.

A ball-bearing unit 146 is disposed within opening 126 of partition 122 and rotatably mounts one end 148 of an elongated shaft 150 having the opposite end 152 thereof journalled within bearing units 136 and 138. End 152 is threaded as at 154 for threadably receiving a nut 156 having a keyway 158 therethrough for receiving a key passing into a keyway in end 152. Shaft 150 is thereby mounted on side wall 42 for rotation about a substantially horizontal axis.

A worm 160 is secured to shaft 150 by virtue of a key 162 disposed in aligned keyways on the inner surface of gear 160 and the outer surface of shaft 150. Worm 160 is provided with a plurality of gear teeth 164 which are in substantial mesh with the teeth 110 of worm gear 108. When shaft 150 is caused to rotate about the axis thereof, worm 160 rotates therewith and "walks" around ring gear 108 to thereby rotate side wall 42 and thereby turret structure 10 about cylinder 64.

Gear means 58 includes a first spur gear 166 secured at the end 148 of shaft 150 for rotation therewith. Gear 166 is disposed within region 56 on the side of partition 122 opposite to the side adjacent worm 160.

First spur gear 166 is in substantial mesh with an idler gear 168 rotatably mounted on a shaft 170, the latter having ends received within a recess 172 in wall section 50 and within a recess 174 in a cap member 176 secured to the coupling element 52 at base portion 12 by a plurality of stud bolts 178. A key 180 passes through a boss 182 and through the proximal end of the shaft 170 to maintain the latter in a fixed position relative to wall section 50 and cap member 176.

Gear 168 is connected with a second spur gear 184, the latter also being rotatably mounted on shaft 170 adjacent the end thereof containing key 180. Gear 184 is in substantial mesh with a third spur gear 186 of reduced diameter rigid to an elongated shaft 188 spaced above and substantially parallel with shafts 150 and 170. The normally outermost end of shaft 188 is operably coupled to a bearing unit 190 receivable within a recess 192 in cap member 176, and shaft 188 projects through an opening 194 in wall section 50 as is clear in FIG. 7. A ball-bearing unit 196 surrounds and journals shaft 188 within a collar 198 having a flange 200 secured to wall section 50 by a plurality of screws 202. Collar 198 extends through opening 194 with the flange 200 thereof engaging a portion of the wall section 50 to prevent further travel of collar 198 away from cap member 176.

An annular plate 204 is secured to the end of collar 198 opposite to the end having flange 200, and plate 204 is provided with a peripheral edge 206 in surrounding spaced relationship to shaft 188. Screws 208 interconnect plate 204 to collar 198. An annular spacing device 210 abuts the proximal face of plate 204 and extends outwardly therefrom, it being clear that plate 204 is provided with an opening 212 centrally thereof, permitting shaft 188 to pass therethrough. Spacing device 210 is provided with a plurality of circumferentially spaced teeth 211 on the inner peripheral surface thereof.

A block 214 abuts the proximal edge of spacing device 210 and is provided with an opening 216 centrally thereof in surrounding relationship to an extension of the longitudinal axis of shaft 188. A base plate 218 interconnected to a power-actuated device 220 by virtue of a coupling member 222, is secured to the proximal face of block 214 by a plurality of stud bolts 224, bolts 224 passing through block 214 and threadably received within aligned, internally threaded openings (not shown) in plate 204. By virtue of the aforesaid construction, power-actuated device 220 is rigidly secured to wall section 50 and movable therewith about the cylinder 64.

Power-actuated device 220 may be of any type capable of heavy duty work such as is required in rotating a boom turret or the like, and preferably device 220 is in the nature of an hydraulic motor adapted to be operably coupled to a source of hydraulic fluid. Device 220 may be of the reversible type so that the drive shaft 226 thereof, which projects through coupling member 222 and base plate 218 into the opening 216, may be caused to rotate in opposed directions about the longitudinal axis thereof. This, of course, is accomplished by directing hydraulic fluid in opposed directions into and out of device 220 by means of a control system mounted on the support structure to which turret structure 10 is attached.

Drive shaft 226 of device 220 is provided with a spur gear 228 at the outermost end thereof within spacing device 210, the latter being substantially concentric to gear 228. Gear 228 is in substantial mesh with a spur gear 230 which is rotatably mounted on a shaft 232 keyed to an annular element 234 by virtue of a key 236. Gear 230 meshes with teeth 211 of device 210, and, since device 210 is fixed, gear 230 rotates or "walks" within device 210 when gear 228 is rotated.

Element 234 is integral with a sleeve 238 which is secured to shaft 188 in any suitable manner such as by a key or the like, for rotation therewith. Gear 228 thereby represents a sun gear and gear 230 represents a planetary gear movable about gear 228 to rotate element 234 in the same direction. It is noted that shaft 188 terminates in spaced relationship to the outer most end of drive shaft 226, and a spacer 240 abuts the proximal faces of gear 228 and sleeve 238. Rotation of shaft 226 by energizing device 220, causes gears 228 and 230 to move relative to each other, and upon movement of gear 230, element 234 and, thereby shaft 188, rotates in the same direction about gear 228 as gear 230. Rotation of shaft 188 causes gears 184 and 168 to rotate to thereby rotate gear 166 and shaft 150. Thereupon, worm 160 is caused to rotate to thereby "walk" around the worm gear 108 to rotate base portion 12 and thereby turret structure 10 relative to cylinder 64.

In operation, cylinder 64 is normally mounted on the support with which structure 10 is adapted to be coupled. Generally, cylinder 64 is mounted on the upper rear surface of a mobile vehicle with the uppermost extremity of cylinder 64 disposed above the vehicle itself. Turret structure 10 is rotatably mounted on cylinder 64 with worm 160 in substantial mesh with worm gear 108. Device 220, which is generally an hydraulic motor, is disposed above top wall 44 between plate members 14 and 16. Device 220 is operably coupled through gear means 58 to shaft 150 and thereby worm 160. The hydraulic lines to device 220 preferably pass through the cylinder 64 and out through the open upper end of the latter for connection at appropriate inlet and outlet ports on device 220.

It is assumed that the boom is operably coupled at the end 18 thereof to plate members 14 and 16 and the power-actuated apparatus is mounted at the end 20 thereof also on plate members 14 and 16. When it is desired to rotate the boom about the axis of cylinder 64, device 220 is energized to direct hydraulic fluid thereto to rotate the drive shaft 226 in the appropriate direction. Rotation of drive shaft 226 causes gear 228 to rotate in the same direction while causing gear 230 to rotate in the opposite direction on shaft 232. Although gear 230 rotates in a direction opposite to the direction of rotation of gear 228, shaft 232 revolves around shaft 228 in the direction of rotation of the latter to thereby cause shaft 188 to rotate in the same direction as gear 228. Thereupon, gear 184 rotates in the opposite direction as gear 228 by virtue of being coupled to shaft 188 through gear 186. Gear 166 and shaft 150 rotate in the direction opposite to the direction of rotation of gears 168 and 184 to thereby rotate worm 160 in the same direction as drive shaft 226 of device 220. Worm 160 thereby "walks" about ring gear 108 and drives therewith side wall 42 and plate members 14 and 16. When it is desired to rotate structure 10 in the oppoiste direction, the flow of hydraulic fluid into and out of device 220 is reversed to thereby rotate drive shaft 226 in the opposite direction and, through the gear means 58, drive worm gear 160 so that the same "walks" in the direction opposite to that set forth above.

It is to be noted that by proper interconnection of the hydraulic lines to device 220, turret structure 10 may be caused to rotate any number of revolutions about cylinder 64 since there is no interference with the rotation thereof so long as device 220 is permitted to be energized.

Having thus described the invention, what is claimed as new and desired to be secured by Letters Patent is:

1. Apparatus for rotatably mounting an elongated boom on a mobile vehicle, said apparatus comprising a support adapted to be secured to said vehicle; turret structure including a base and a pair of plate members secured to said base and normally projecting upwardly therefrom, said base being rotatably mounted on said support for movement about a vertical axis, said plate members being adapted for mounting therebetween one end of said boom for movement relative thereto; power-actuated mechanism carried by said base between said plate members and provided with a drive shaft; and means operably coupled to said support and the drive shaft of said mechanism for rotating the latter and thereby said structure about said axis to thereby rotate said boom, said rotating means comprising first gear means on said support, second gear means on said base and operably coupled with said first gear means for movement relative thereto, and planetary gear means on said drive shaft for interconnecting the latter with said second gear means, said planetary gear means including an element rotatably mounted on said structure, a gear train operably coupling said element with said second gear means, a planetary gear rotatably mounted on said element and movable therewith along a path substantially concentric to the axis of rotation thereof, and a sun gear fixed to said drive shaft and in mesh with said planetary gear.

2. Apparatus as set forth in claim 1, said first gear means comprising a worm gear, said second gear means comprising a worm in substantial mesh with said worm gear, and a driven shaft for said worm mounted on said structure for rotation about a substantially horizontal axis, said gear train being coupled with said driven shaft.

3. Apparatus as set forth in claim 2, an annular member rigid with said structure in surrounding relationship with said sun gear, said member being provided with circumferentially spaced teeth on its inner peripheral surface meshing with said planetary gear.

4. In combination, a support; structure mounted on said support for rotation relative thereto; power-actuated mechanism carried by said structure and provided with a drive shaft; and means operably coupled with said support and the drive shaft of said mechanism for rotating the latter and thereby said structure relative to said support, said rotating means including first gear means on said support, second gear means on said structure and operably coupled with said first gear means for movement relative thereto, and planetary gear means on said drive shaft for interconnecting the latter with said second gear means, said planetary gear means including an element rotatably mounted on said structure, a gear train operably coupling said element with said second gear means, a planetary gear rotatably mounted on said element and movable therewith along a path substantially concentric to the axis of rotation thereof, and a sun gear fixed to said drive shaft and in mesh with said planetary gear.

References Cited in the file of this patent
UNITED STATES PATENTS

| 2,167,026 | Hatch | July 25, 1939 |
| 2,841,960 | Holan et al. | July 8, 1958 |
| 2,994,446 | Auwelaer et al. | Aug. 1, 1961 |

FOREIGN PATENTS

| 1,091,726 | Germany | Oct. 27, 1960 |